(12) United States Patent
Hidaka et al.

(10) Patent No.: US 9,794,998 B2
(45) Date of Patent: Oct. 17, 2017

(54) LIGHTING SYSTEM AND CONTROLLER

(71) Applicant: Panasonic Intellectual Property Management Co., Ltd., Osaka (JP)

(72) Inventors: Yuto Hidaka, Osaka (JP); Tetsuya Tanigawa, Hyogo (JP); Yuka Hatano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/397,444

(22) Filed: Jan. 3, 2017

(65) Prior Publication Data
US 2017/0202069 A1 Jul. 13, 2017

(30) Foreign Application Priority Data
Jan. 8, 2016 (JP) .................. 2016-002998

(51) Int. Cl.
*H05B 33/08* (2006.01)
*H05B 37/02* (2006.01)

(52) U.S. Cl.
CPC ..... *H05B 33/0851* (2013.01); *H05B 33/0866* (2013.01); *H05B 37/0227* (2013.01); *H05B 37/0272* (2013.01)

(58) Field of Classification Search
None
See application file for complete search history.

(56) References Cited

U.S. PATENT DOCUMENTS

| 9,530,342 B2* | 12/2016 | Bell | G09G 3/2003 |
| 2014/0091731 A1 | 4/2014 | Fushimi | |
| 2016/0234906 A1* | 8/2016 | Hidaka | H05B 37/0227 |
| 2016/0262238 A1* | 9/2016 | Moriwaki | H05B 33/0854 |

FOREIGN PATENT DOCUMENTS

| JP | 2009-110688 A | 5/2009 |
| JP | 2011-023339 A | 2/2011 |
| JP | 2011-204471 A | 10/2011 |
| JP | 2014-072083 A | 4/2014 |
| JP | 2015-079694 A | 4/2015 |
| JP | 2015-079695 A | 4/2015 |
| JP | 2015-079696 A | 4/2015 |
| JP | 2015-079697 A | 4/2015 |

* cited by examiner

*Primary Examiner* — Jany Richardson
(74) *Attorney, Agent, or Firm* — McDermott Will & Emery LLP

(57) ABSTRACT

A lighting system includes: a plurality of lighting devices; a controller; and a sensor which detects brightness of a region illuminated by at least two lighting devices among the plurality of lighting devices, wherein the controller includes a lighting controller operable in a plurality of operation modes, the plurality of operation modes include a sensor mode, and when the lighting controller obtains an instruction to operate in the sensor mode, the lighting controller performs (a) transition control for controlling the at least two lighting devices, by transmitting a transition instruction, to cause the at least two lighting devices to provide illumination at a predetermined dimming level, without using a result of detection by the sensor, and (b) dimming control for controlling the at least two lighting devices to cause the brightness indicated by the result of detection by the sensor to approach the target value, after transmitting the transition instruction.

9 Claims, 14 Drawing Sheets

| MODE No. | TARGET VALUE | COLOR TEMPERATURE | TRANSITION DIMMING LEVEL |
|---|---|---|---|
| 1 | 700 lx | 5000 K | 50% |
| 2 | 600 lx | 3000 K | 60% |
| 3 | 500 lx | 5000 K | 70% |

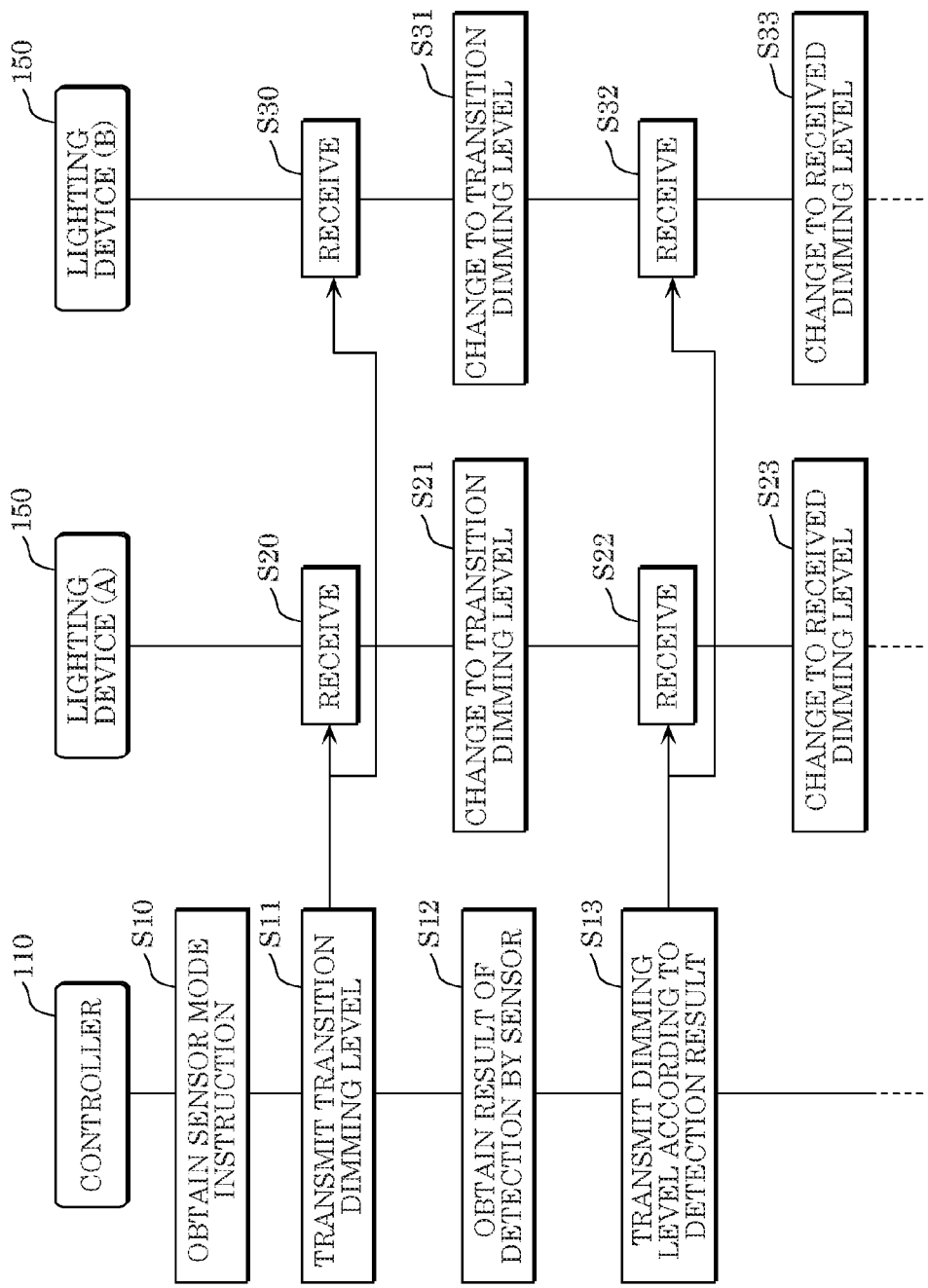

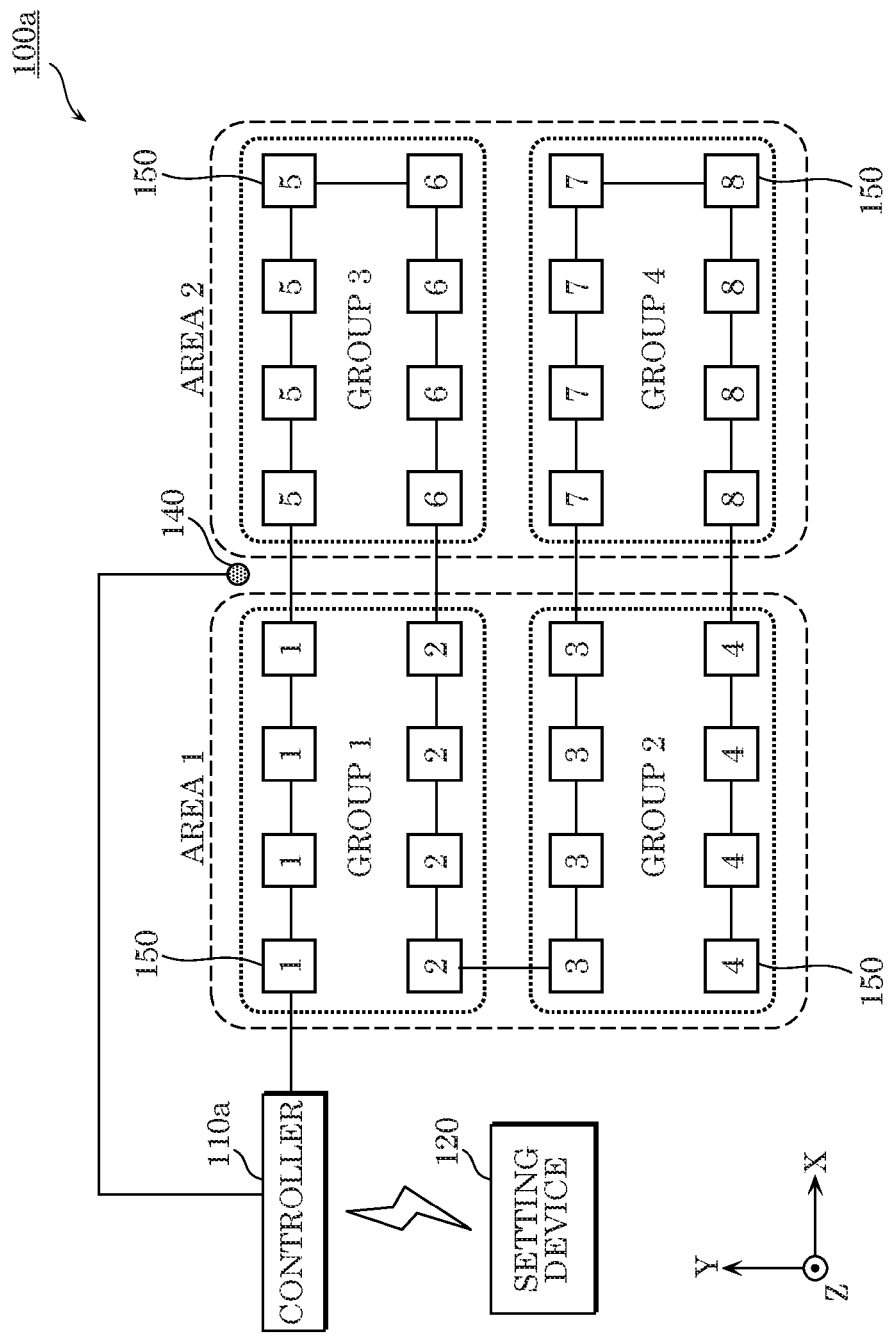

FIG. 10

GROUP 1

| | SCENE 1 | SCENE 2 | SCENE 3 |
|---|---|---|---|
| ZONE 1 | 100% : 5000 K | 50% : 3000 K | 5% : 2000 K |
| ZONE 2 | 5% : 5000 K | 5% : 3000 K | 50% : 5000 K |

0:00      10:00      21:00      24:00

GROUP 2

| | SCENE 1 | SCENE 2 | SCENE 3 |
|---|---|---|---|
| ZONE 3 | 50% : 5000 K | 20% : 3000 K | 10% : 4000 K |
| ZONE 4 | 90% : 5000 K | 90% : 3000 K | 10% : 4000 K |

0:00      8:00      19:00      24:00

GROUP 3

| | SCENE 1 | SCENE 2 | SCENE 3 |
|---|---|---|---|
| ZONE 5 | 0% : — | 40% : 3000 K | 15% : 2000 K |
| ZONE 6 | 15% : 5000 K | 15% : 3000 K | 55% : 5000 K |

0:00      5:00      11:00      24:00

GROUP 4

| | SCENE 1 | SCENE 2 | SCENE 3 |
|---|---|---|---|
| ZONE 7 | 20% : 5000 K | 30% : 3000 K | 40% : 4000 K |
| ZONE 8 | 40% : 5000 K | 30% : 3000 K | 20% : 4000 K |

0:00      11:00      20:00      24:00

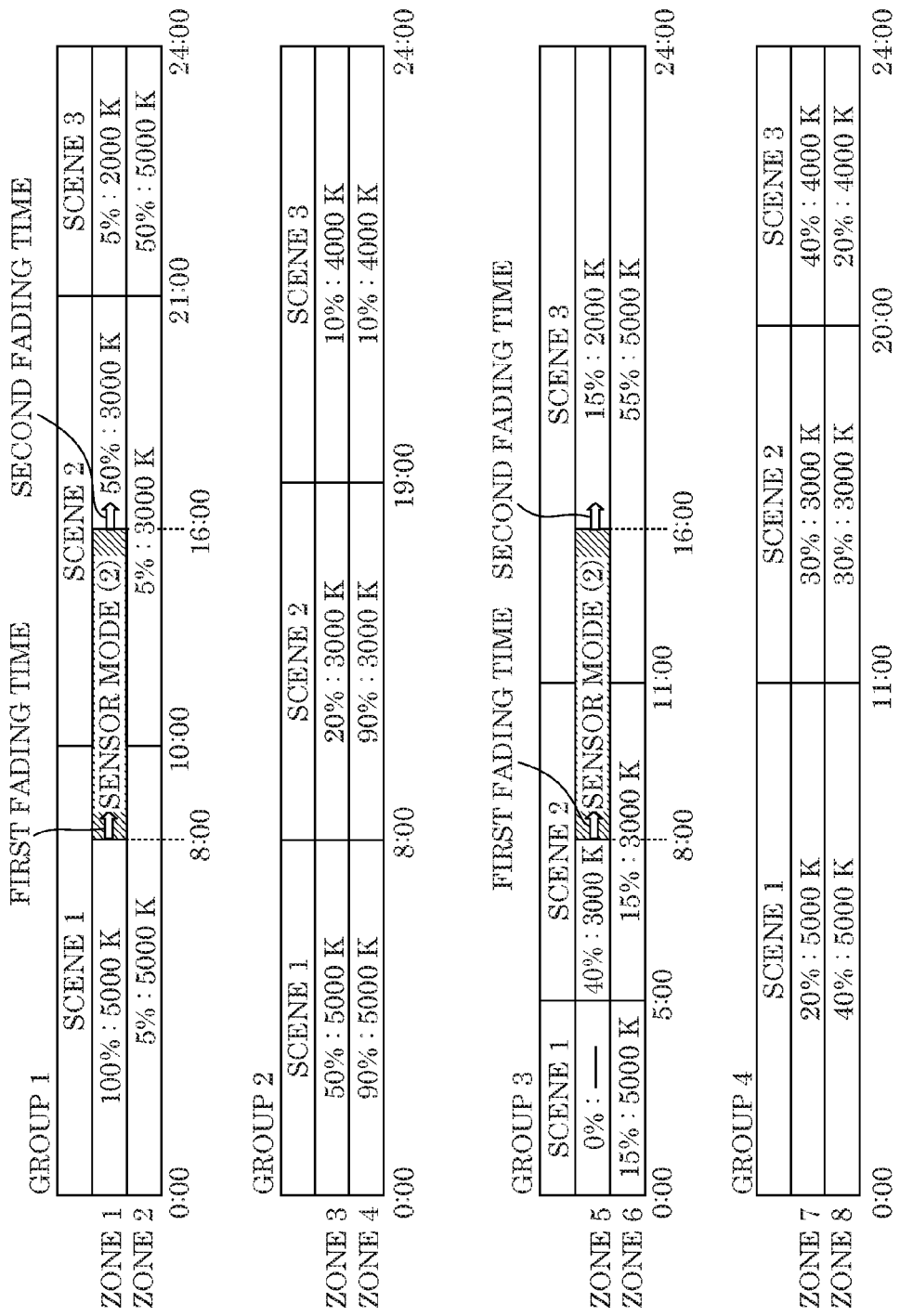

LIGHTING SYSTEM AND CONTROLLER

CROSS REFERENCE TO RELATED APPLICATION

This application claims the benefit of priority of Japanese Patent Application Number 2016-002998 filed on Jan. 8, 2016, the entire content of which is hereby incorporated by reference.

BACKGROUND

1. Technical Field

The present disclosure relates to a controller which controls a plurality of lighting devices, and a lighting system which includes the plurality of lighting devices and the controller.

2. Description of the Related Art

Conventionally, a lighting control device has been known which controls a dimming level of a lighting device such as an LED light on the ceiling.

For example, according to a lighting control device disclosed in Japanese Unexamined Patent Application Publication No. 2015-079695, an illuminance sensor detects the illuminance of a first region close to an open portion of a room. According to the detection result, the lighting control device further changes the dimming level of a lighting device installed in the first region, and also changes the dimming level of a lighting device installed in a second region distant from the open portion of the room.

SUMMARY

The above conventional technology maintains a room at constant brightness while eliminating the influence of change in natural light by changing the dimming level of a lighting device according to a result of detection by an illuminance sensor. Specifically, the lighting device is controlled such that the result of detection by the illuminance sensor approaches a preset target value, thus maintaining the room at substantially constant brightness.

However, when one illuminance sensor detects the brightness of a room where a plurality of lighting devices are disposed, and the plurality of lighting devices are controlled using the detection result, if, for example, the brightness detected by the illuminance sensor matches the target value, the dimming levels of the lighting devices are maintained as they are, independently of the states of the lighting devices. Accordingly, the illumined space formed by light from the lighting devices may be maintained in an unnatural state for a long time.

In view of the above conventional problem, the present disclosure provides a controller which can appropriately control a plurality of lighting devices using the result of detection by a single sensor, and a lighting system which includes the plurality of lighting devices and the controller.

A lighting system according to an aspect of the present disclosure is a lighting system including: a plurality of lighting devices; a controller which controls each of the plurality of lighting devices; and a sensor which detects brightness of a region illuminated by at least two lighting devices among the plurality of lighting devices, wherein each of the plurality of lighting devices includes: a light source; and a light source controller which controls the light source in accordance with an instruction transmitted from the controller, the controller includes: a storage storing a predetermined dimming level and a target value of the brightness of the region; and a lighting controller operable in a plurality of operation modes, the plurality of operation modes include a sensor mode for controlling the at least two lighting devices to cause the brightness of the region to approach the target value, and when the lighting controller obtains an instruction to operate in the sensor mode, the lighting controller performs (a) transition control for controlling the at least two lighting devices, by transmitting a transition instruction, to cause the at least two lighting devices to provide illumination at the predetermined dimming level, without using a result of detection by the sensor, and (b) dimming control for controlling the at least two lighting devices to cause the brightness indicated by the result of detection by the sensor to approach the target value, after transmitting the transition instruction.

A lighting system according to an aspect of the present disclosure is a lighting system including: a plurality of lighting devices; a controller which controls each of the plurality of lighting devices; a sensor which detects brightness of a region illuminated by at least two lighting devices among the plurality of lighting devices; and a communication terminal which communicates with the controller, wherein the plurality of lighting devices each include: a light source; and a light source controller which controls the light source in accordance with an instruction transmitted from the controller, the communication terminal includes: a receiver which receives input of a predetermined dimming level and a target value of the brightness of the region; and a communicator which transmits, to the controller, the predetermined dimming level and the target value received by the receiver, the controller includes: a storage storing the predetermined dimming level and the target value transmitted by the communication terminal; and a lighting controller operable in a plurality of operation modes, the plurality of operation modes include a sensor mode for controlling the at least two lighting devices to cause the brightness of the region to approach the target value, and when the lighting controller obtains an instruction to operate in the sensor mode, the lighting controller performs (a) transition control for controlling the at least two lighting devices, by transmitting a transition instruction, to cause the at least two lighting devices to provide illumination at the predetermined dimming level, without using a result of detection by the sensor, and (b) dimming control for controlling the at least two lighting devices to cause the brightness indicated by the result of detection by the sensor to approach the target value, after transmitting the transition instruction.

A controller according to an aspect of the present disclosure is a controller which controls each of a plurality of lighting devices, the controller including: a storage storing a predetermined dimming level and a target value of brightness of a region illuminated by at least two lighting devices among the plurality of lighting devices; and a lighting controller operable in a plurality of operation modes including a sensor mode for controlling the at least two lighting devices to cause the brightness of the region to approach the target value, wherein when the lighting controller obtains an instruction to operate in the sensor mode, the lighting controller performs (a) transition control for transmitting, to the at least two lighting devices, a transition instruction to provide illumination at the predetermined dimming level, without using a result of detection by the sensor which detects the brightness of the region, and (b) dimming control for transmitting, to the at least two lighting devices, a dimming control instruction to cause the brightness indicated by the result of detection by the sensor to approach the target value, after transmitting the transition instruction.

The present disclosure provides a controller which can appropriately control a plurality of lighting devices using a result of detection by a single sensor, according to the environment where lighting devices are installed. The present disclosure provides a lighting system which includes the lighting devices and the controller.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 4 is a sequence diagram illustrating a flow of basic operation of the lighting system according to Embodiment 1;

FIG. 5A is a first diagram illustrating a schematic configuration of a lighting system according to Embodiment 2;

FIG. 10 is a first diagram illustrating states of lighting devices for each group according to Embodiment 2;

FIG. 13 is a second diagram illustrating states of lighting devices for each group according to Embodiment 2.

DETAILED DESCRIPTION OF THE EMBODIMENTS

Figure 1A:
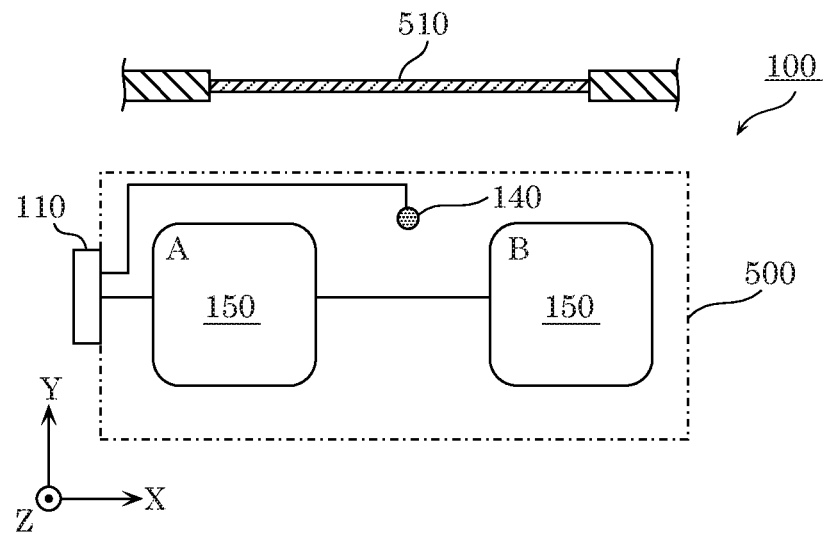
FIG. 1A is a first diagram illustrating a schematic configuration of a lighting system according to Embodiment 1.

The following describes a lighting system according to embodiments with reference to the drawings. Note that the embodiments described below each show a specific example of the present disclosure. The numerical values, shapes, materials, elements, the arrangement and connection of the elements, and others indicated in the following embodiments are mere examples, and therefore are not intended to limit the present disclosure. Therefore, among the elements in the following embodiments, elements not recited in any of the independent claims defining the most generic part of the present disclosure are described as arbitrary elements.

Note that the drawings are schematic diagrams, and do not necessarily provide strictly accurate illustration. In the drawings, the same numeral is given to substantially the same configuration, and a redundant description thereof may be omitted or simplified.

Embodiment 1

The following describes a lighting system according to Embodiment 1.

[Configuration of Lighting System]

First, a description of a configuration of a lighting system according to Embodiment 1 is given with reference to FIGS. 1A, 1B, 2, and 3.

Figure 1B:
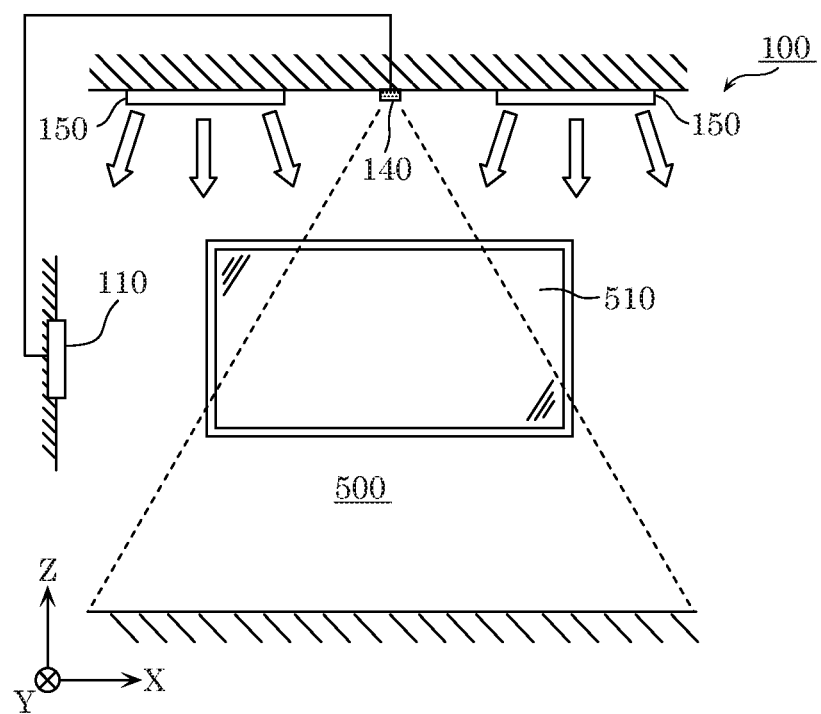
FIG. 1B is a second diagram illustrating a schematic configuration of the lighting system according to Embodiment 1.

FIG. 1A is a first diagram illustrating a schematic configuration of lighting system 100 according to Embodiment 1, and FIG. 1B is a second diagram illustrating a schematic configuration of lighting system 100 according to Embodiment 1.

Figure 2:
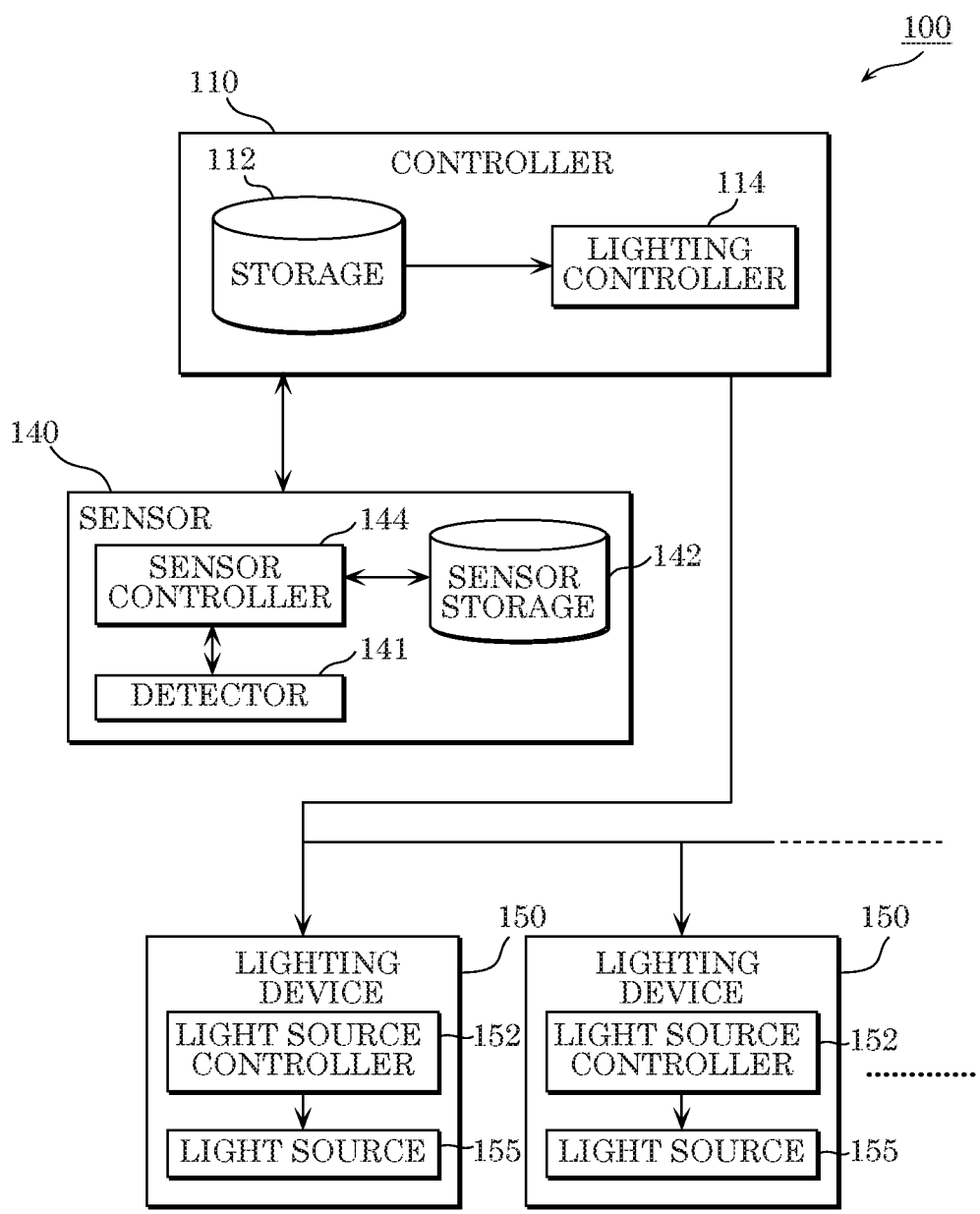
FIG. 2 is a block diagram illustrating a functional configuration of the lighting system according to Embodiment 1.
Figure 3:
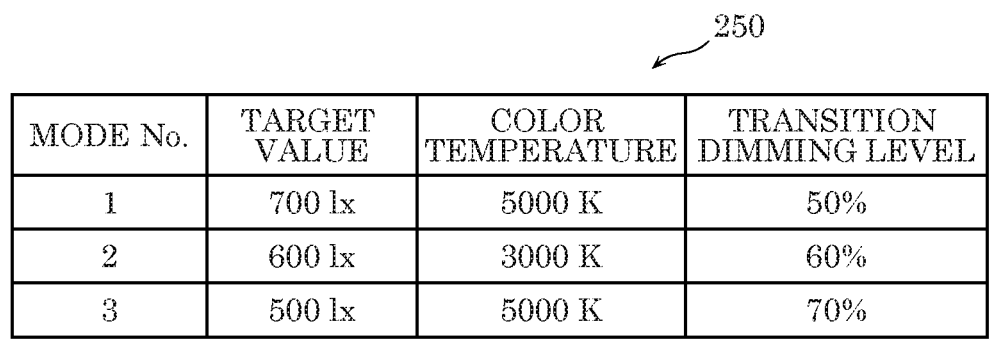
FIG. 3 illustrates am example of a data configuration of sensor mode information according to Embodiment 1.

Specifically, FIG. 1A is a top view illustrating an example of the layout of elements of lighting system 100, and FIG. 1B is a side view corresponding to FIG. 1A. Note that depictions of the lines that connect controller 110 and lighting devices 150 are omitted from FIG. 1B. While lighting system 100 is installed in a space (room) which needs lighting such as, for example, a room in an office building or a house, depictions of objects which may be present in the space, such as fixtures and persons, are omitted from FIGS. 1A and 1B. Such supplementary matters regarding FIGS. 1A and 1B are also applied to FIGS. 5A and 5B described below FIG. 2 is a block diagram illustrating a functional configuration of lighting system 100 according to Embodiment 1. FIG. 3 illustrates an example of a data configuration of sensor mode information 250 stored in storage 112 of controller 110.

As illustrated in the drawings, lighting system 100 according to Embodiment 1 includes lighting devices 150, controller 110, and sensor 140. Although FIG. 1A illustrates lighting system 100 which includes two lighting devices 150 labeled with A and B, at least two lighting devices 150 may be included in lighting system 100.

Lighting device 150 includes light source 155 and light source controller 152. Light source controller 152 controls light source 155 in accordance with an instruction from controller 110.

Lighting device 150 is a ceiling light which includes, for example, a light-emitting device which is light source 155, which includes one or more light emitting diodes (LEDs). In this case, light source controller 152 is a drive circuit (light circuit) which controls operation of the light-emitting device, such as turning on and off and dimming the light-emitting device, for example.

Controller 110 is a device which controls each of lighting devices 150. Controller 110 includes storage 112 and lighting controller 114. Storage 112 is a storage device such as a semiconductor memory, for example, and stores at least sensor mode information 250, in the present embodiment.

Lighting controller 114 can control each of lighting devices 150 by transmitting an instruction to each of lighting devices 150. For example, lighting controller 114 transmits, to one or more lighting devices 150, an instruction which includes a dimming level read from storage 112, to cause the one or more lighting devices 150 to provide illumination at the dimming level.

Note that a dimming level is a type of a variable for adjusting the brightness of a light, and the brightness of the light increases with an increase in the numerical value of the variable (the maximum value is 100%). Furthermore, the dimming level can also be represented as a "dimming degree" or a "dimming ratio," for example.

For example, if controller 110 gives an instruction indicating the dimming level "100%" to lighting device 150, controller 110 transmits an instruction signal corresponding to the dimming level "100%" to lighting device 150. In accordance with an instruction indicated by the instruction signal, light source controller 152 of lighting device 150 controls light source 155 to increase the optical output of light source 155 to the maximum.

Light source controller 152 controls the optical output of light source 155 according to a pulse width modulation (PWM) signal, for example. However, a technique used for this control is not particularly limited, and dimming of lighting device 150 may be controlled according to a digital signal.

For example, if light source 155 includes a plurality of light emitters such as a plurality of LEDs, dimming of light source 155 may be controlled by changing the number of light emitters to be turned on, among the light emitters.

Note that lighting controller 114 has, for example, a function of obtaining instructions from a user and a communication terminal, in addition to a function of reading information from storage 112 and a function of transmitting an instruction to lighting devices 150. Furthermore, controller 110 includes a display device, a touch panel, or a device such as a communication module not illustrated in FIG. 2, and thus allows information exchange between the user and the communication terminal.

The place where controller 110 having the above configuration is disposed is not particularly limited. In the present embodiment, controller 110 is disposed on the wall of a room as illustrated in FIG. 1B, and can receive user operation via a touch panel or a physical key. Controller 110 can transmit, to lighting devices 150 via wire or wirelessly, instructions to, for instance, turn on and off and change a dimming level, based on user operation, for example.

Sensor 140 is an illuminance sensor in the present embodiment, and is disposed so as to detect brightness of a region (detection target region 500) illuminated by at least two lighting devices 150, as illustrated in FIG. 1A. There is window 510 near detection target region 500, as illustrated in FIGS. 1A and 1B, and thus the brightness (illuminance) observed in detection target region 500 is greatly influenced by natural light. In such a state, controller 110 can operate in a sensor mode which is an operation mode for controlling lighting devices 150, based on the result of detection by sensor 140.

Specifically, sensor 140 includes detector 141, sensor storage 142, and sensor controller 144, as illustrated in FIG. 2. Detector 141 images detection target region 500 using a solid state image sensor such as a complementary metal-oxide semiconductor (CMOS) image sensor, and detects brightness from image data obtained as a result of the imaging.

Sensor storage 142 is a storage device such as semiconductor memory, for example, and stores at least a target value of brightness transmitted from controller 110 in the present embodiment.

Sensor controller 144 compares brightness (detected illuminance) detected by detector 141 with a target value stored in sensor storage 142, and transmits information indicating the comparison result to controller 110.

Examples of such information indicating the comparison result include "−1" which indicates that the detected illuminance is lower than the target value, "0" which indicates that the detected illuminance matches the target value, and "+1" which indicates that the detected illuminance is higher than the target value. Note that the information which indicates the comparison result is an example of the result of detection by sensor 140. Furthermore, if the detected illuminance is within a predetermined range based on the target value (for example, plus or minus 5% of the target value), sensor controller 144 may determine that the detected illuminance matches the target value. In other words, if the detected illuminance is within a predetermined range based on the target value, the result of detection by sensor 140 may be the information indicating "0."

Storage 112 included in controller 110 stores target values of the brightness transmitted from controller 110 as a portion of sensor mode information 250.

Sensor mode information 250 indicates various variables used in the sensor mode which is one of the operation modes which lighting controller 114 executes. When operating in the sensor mode, lighting controller 114 controls two lighting devices 150 (A and B in FIG. 1A) to cause the brightness of detection target region 500 to approach the target value indicated in sensor mode information 250.

Note that lighting controller 114 according to the present embodiment can operate in other operation modes such as a manual mode for controlling lighting devices 150 based on user operation as described above, other than the sensor mode.

In the present embodiment, sensor mode information 250 includes sets of variables which define three sensor modes. For example, in a sensor mode having a mode number "2" (hereinafter "sensor mode 2"), the target value is "600 lx (600 lux)" and the color temperature is "3000 K (3000 kelvin)." Note that how a "transition dimming level" included in sensor mode information 250 is used is later described with reference to FIG. 4.

For example, when lighting controller 114 operates in sensor mode 2 according to an instruction from a user or a communication terminal, the basic operation of lighting controller 114 is as follows.

Lighting controller 114 controls two lighting devices 150 to cause the brightness detected by sensor 140 to approach "600 lx." Specifically, if the result of detection by sensor 140 indicates "−1," lighting controller 114 increases the dimming levels of two lighting devices 150. If the result of detection by sensor 140 indicates "1," lighting controller 114 decreases the dimming levels of two lighting devices 150. Note that units of increase/decrease in dimming level are not particularly limited, and lighting controller 114 may control lighting devices 150 to increase or decrease the dimming level by 5% in accordance with one given instruction, for example.

If lighting controller 114 is to operate in sensor mode 2, for example, when lighting controller 114 transmits an instruction which includes a dimming level to each of two lighting devices 150, the instruction transmitted by lighting controller 114 to each of two lighting devices 150 includes control information (color adjustment instruction) for color adjustment corresponding to "3000 K." In this manner, each of two lighting devices 150 performs color adjustment control to cause the color temperature to approach "3000 K." Note that an instruction as to the color temperature may be given to each of two lighting devices 150 only once along with a firstly given instruction as to the dimming level or each time an instruction as to the dimming level is given.

Note that the layout of lighting system 100 illustrated in FIGS. 1A and 1B is an example, and different layouts may be used. For example, sensor 140 may be disposed in one of lighting devices 150. For example, controller 110 may be accommodated in the device body of one lighting device 150. In this case, a user can give an instruction to controller 110 via, for example, a communication terminal which performs wireless communication. In other words, lighting system 100 may be achieved as a lighting device having a configuration equivalent to that of lighting system 100.

At least one of various functions of controller 110 and sensor 140 according to the present embodiment may be achieved by software such as a program executed on a computer which includes, for instance, a central processing unit (CPU), random access memory (RAM), read only memory (ROM), a communication interface, and an input/output (I/O) port, or may be achieved by hardware such as an electronic circuit. In other words, for example, lighting controller 114 of controller 110 is a processor such as a microprocessor, and executes a program stored in the ROM included in the computer, thus controlling, for instance, a change in the dimming levels of lighting devices 150.

[Operation of Lighting System]

In the present embodiment, two lighting devices 150 can be independently controlled as described above. Accordingly, a situation may occur in which, for example, one of two lighting devices 150 provides illumination at the dimming level "10%," whereas the other of two lighting devices 150 provides illumination at the dimming level "100%." In other words, brightness of two adjacent lighting devices 150 may be greatly different.

In a state where the brightness of two lighting devices 150 is greatly different as described above, if controller 110 simply starts operation in the sensor mode according to, for example, user operation or an instruction transmitted from a communication terminal, the following problems may arise.

Specifically, there are plural (two in the present embodiment) lighting devices 150 which illuminate detection target region 500, whereas there is one sensor 140 used to detect the brightness of detection target region 500. Accordingly, even if the brightness of two lighting devices 150 is greatly different, the detected illuminance of sensor 140 may match a target value (for example, "600 lx"). In this case, the result of detection by sensor 140 which controller 110 obtains indicates "0," and lighting controller 114 of controller 110 does not transmit an instruction to change the dimming levels to two lighting devices 150. As a result, a state is also conceivable in which the brightness of two lighting devices 150 is greatly different is maintained for a long time.

In view of this, in the present embodiment, when controller 110 obtains an instruction to operate in the sensor mode, controller 110 controls two lighting devices 150 to make the brightness of two lighting devices 150 substantially the same, and thereafter starts controlling lighting devices 150 using the result of detection by sensor 140. A description of a series of the operations is given with reference to FIG. 4.

FIG. 4 is a sequence diagram illustrating a flow of basic operation of lighting system 100 according to Embodiment 1.

Lighting controller 114 of controller 110 obtains an instruction to operate in the sensor mode (S10). Specifically, lighting controller 114 obtains an instruction to operate in the sensor mode by, for instance, receiving a user operation, receiving an instruction transmitted from a communication terminal, or reading a schedule stored in storage 112.

Lighting controller 114 transmits a transition instruction which is an instruction to provide illumination at a predetermined dimming level to at least two lighting devices 150 (two lighting devices 150 in the present embodiment (see FIGS. 1A and 1B)) without using a result of detection by sensor 140 (S11). Note that transmitting such a transition instruction is referred to as "transition control."

For example, if lighting controller 114 obtains an instruction to operate in sensor mode 2, lighting controller 114 reads the transition dimming level "60%" for the mode number "2" from sensor mode information 250 stored in storage 112. Lighting controller 114 further transmits a transition instruction which is an instruction to provide illumination at the dimming level "60%" to two lighting devices 150. Note that in order to distinguish two lighting devices 150, one of two lighting devices 150 is referred to as "lighting device A," and the other is referred to as "lighting device B." Lighting controller 114 transmits the target value "600 lx" for the mode number "2" read from sensor mode information 250 to sensor 140, and sensor 140 stores the target value "600 lx" in sensor storage 142.

Light source controller 152 of lighting device A receives the transition instruction transmitted from controller 110 (S20), and reads the dimming level "60%" from the received transition instruction. Light source controller 152 changes the dimming level set at the time point to "60%" (S21). Note that if the dimming level set at the time point is "60%," the dimming level is maintained as it is.

Light source controller 152 of lighting device B receives the transition instruction transmitted from controller 110 (S30), and reads the dimming level "60%" from the received transition instruction. Light source controller 152 changes the dimming level set at the time point to "60%" (S31). Note that if the dimming level at the time point is "60%," the dimming level is maintained as it is.

The above operation causes both lighting device A and lighting device B to be providing illumination at the dimming level "60%."

In sensor 140, sensor storage 142 stores the target value "600 lx" as described above, and sensor controller 144 compares the illuminance detected by detector 141 with the target value "600 lx" at predetermined intervals (every one second, for example). Sensor controller 144 further transmits information indicating the result of the comparison (such as "−1," "0," or "+1" mentioned above) to controller 110 at the predetermined intervals.

Lighting controller 114 of controller 110 transmits a transition instruction (S11), and thereafter obtains the result of detection by sensor 140 (S12). In other words, lighting controller 114 obtains the result of comparison (result of detection by sensor controller 144) indicating the magnitude relation between the illuminance detected by sensor 140 and the target value "600 lx."

Note that lighting controller 114 ignores the detection result received from sensor 140 before a predetermined period (for example, several seconds to several tens of seconds) has elapsed since lighting controller 114 has transmitted the transition instruction (S11). Sensor 140 may transmit the detection result to controller 110 upon receipt of a request from lighting controller 114, which is a trigger.

Lighting controller 114 transmits a dimming level according to the obtained detection result to lighting devices A and B (S13). For example, if the obtained detection result indicates "−1," the result means that the detected illuminance is lower than the target value. Accordingly, lighting controller 114 transmits an instruction which includes the dimming level "65%" to lighting devices A and B, for example.

Each of light source controllers 152 of lighting devices A and B receives the instruction from lighting controller 114

(S22, S32), and change the dimming level of light source 155 from "60%" to "65%" (S23, S33).

After that, lighting controller 114 continuously controls (the dimming of) lighting devices A and B, based on the result of detection by sensor 140, until lighting controller 114 obtains the detection result indicating "0." Furthermore, if lighting controller 114 obtains the detection result indicating "−1" or "+1" after that, lighting controller 114 resumes controlling the dimming of lighting devices A and B. By performing the above operation, lighting system 100 can maintain the brightness of a region illuminated by lighting devices A and B (see detection target region 500 in FIG. 1A) at the target value "600 lx" or within a range in the vicinity of the target value "600 lx."

[Advantageous Effects and Others]

As described above, lighting system 100 according to the present embodiment includes: lighting devices 150; controller 110 which controls each of lighting devices 150; and sensor 140 which detects brightness of a region (detection target region 500) illuminated by at least two lighting devices 150.

Lighting devices 150 each include: light source 155; and light source controller 152 which controls light source 155 in accordance with an instruction transmitted from controller 110.

Controller 110 includes: storage 112; and lighting controller 114. Storage 112 stores a transition dimming level and a target value of the brightness of detection target region 500 (see FIG. 3). Lighting controller 114 is operable in a plurality of operation modes including a sensor mode for controlling at least two lighting devices 150 to cause the brightness of detection target region 500 to approach the target value. In the present embodiment, the plurality of operation modes include at least the sensor mode and a manual mode.

When lighting controller 114 obtains an instruction to operate in the sensor mode, lighting controller 114 performs (a) transition control for controlling at least two lighting devices 150, by transmitting a transition instruction, to cause at least two lighting devices 150 to provide illumination at the transition dimming level, without using a result of detection by sensor 140, and (b) dimming control for controlling at least two lighting devices 150 to cause the brightness indicated by the result of detection by sensor 140 to approach the target value, after transmitting the transition instruction.

In this manner, controller 110 first gives an instruction to at least two lighting devices 150 (lighting devices A and B in the present embodiment) to provide illumination at the transition dimming level, if controller 110 obtains an instruction to operate in the sensor mode.

In other words, the transition control by controller 110 once makes the dimming levels of lighting devices A and B substantially the same. After that, controller 110 controls dimming of lighting devices A and B using the result of detection by sensor 140. In other words, when the sensor mode starts, first, the dimming levels of lighting devices A and B are changed independently of the result of detection by sensor 140, and thereafter, the dimming levels of lighting devices A and B are changed, dependently of the result of detection by sensor 140.

Thus, at a point in time when control in the sensor mode starts, even if the dimming levels of lighting devices A and B are different, the dimming levels are made substantially the same, and thereafter dimming is controlled using the result of detection by sensor 140. This prevents the occurrence of, for example, a state where the dimming levels of lighting devices A and B are greatly different is maintained for a long time, and the brightness of a region illuminated by lighting devices A and B is caused to approach the target value.

As described above, lighting system 100 according to the present embodiment includes controller 110 which can appropriately control lighting devices 150 using the result of detection by single sensor 140.

Note that transition to the sensor mode from another operation mode (for example, manual mode) may be pre-scheduled. If lighting controller 114 transmits an instruction which includes a transition dimming level to lighting devices 150 when transition to the sensor mode is made, the instruction may include a fading time. In this case, lighting devices 150 may each use the fading time as a time to change the dimming level set at a point in time when the instruction is received is changed to the transition dimming level.

In this manner, lighting system 100 according to the present embodiment can be configured to perform still more detailed operation. A lighting system which can, for instance, schedule the operation modes of lighting controller 114 is described as Embodiment 2.

Embodiment 2

The following describes a lighting system according to Embodiment 2, focusing on a difference from Embodiment 1 above.

[Configuration of Lighting System]

Figure 5B:
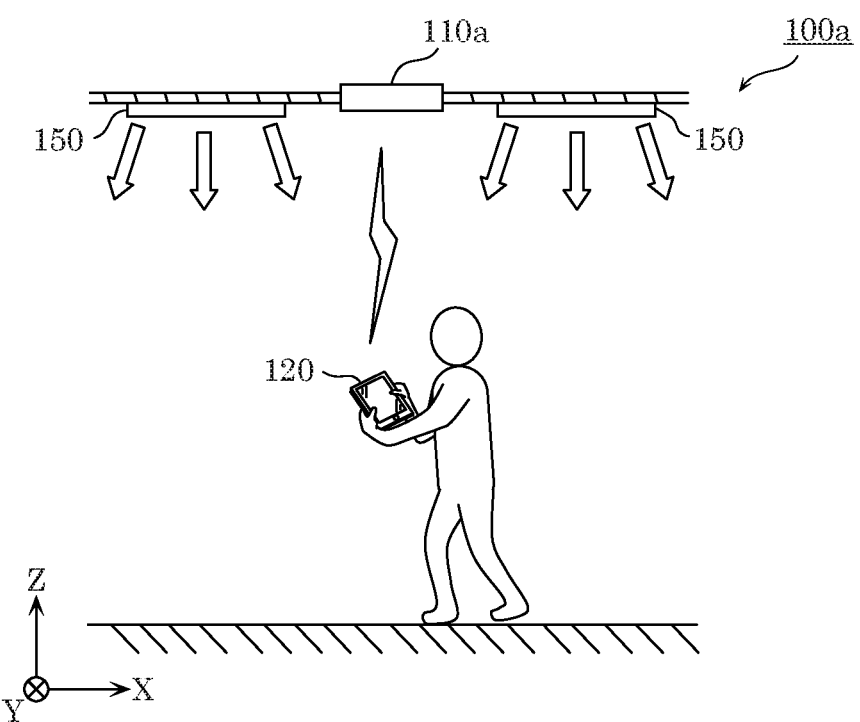
FIG. 5B is a second diagram illustrating a schematic configuration of the lighting system according to Embodiment 2.

FIG. 5A is a first diagram illustrating a schematic configuration of lighting system 100a according to Embodiment 2, and FIG. 5B is a second diagram illustrating a schematic configuration of lighting system 100a according to Embodiment 2.

Specifically, FIG. 5A is a top view illustrating an example of the layout of elements of lighting system 100a, and FIG. 5B is a side view corresponding to a portion of FIG. 5A.

Figure 6:
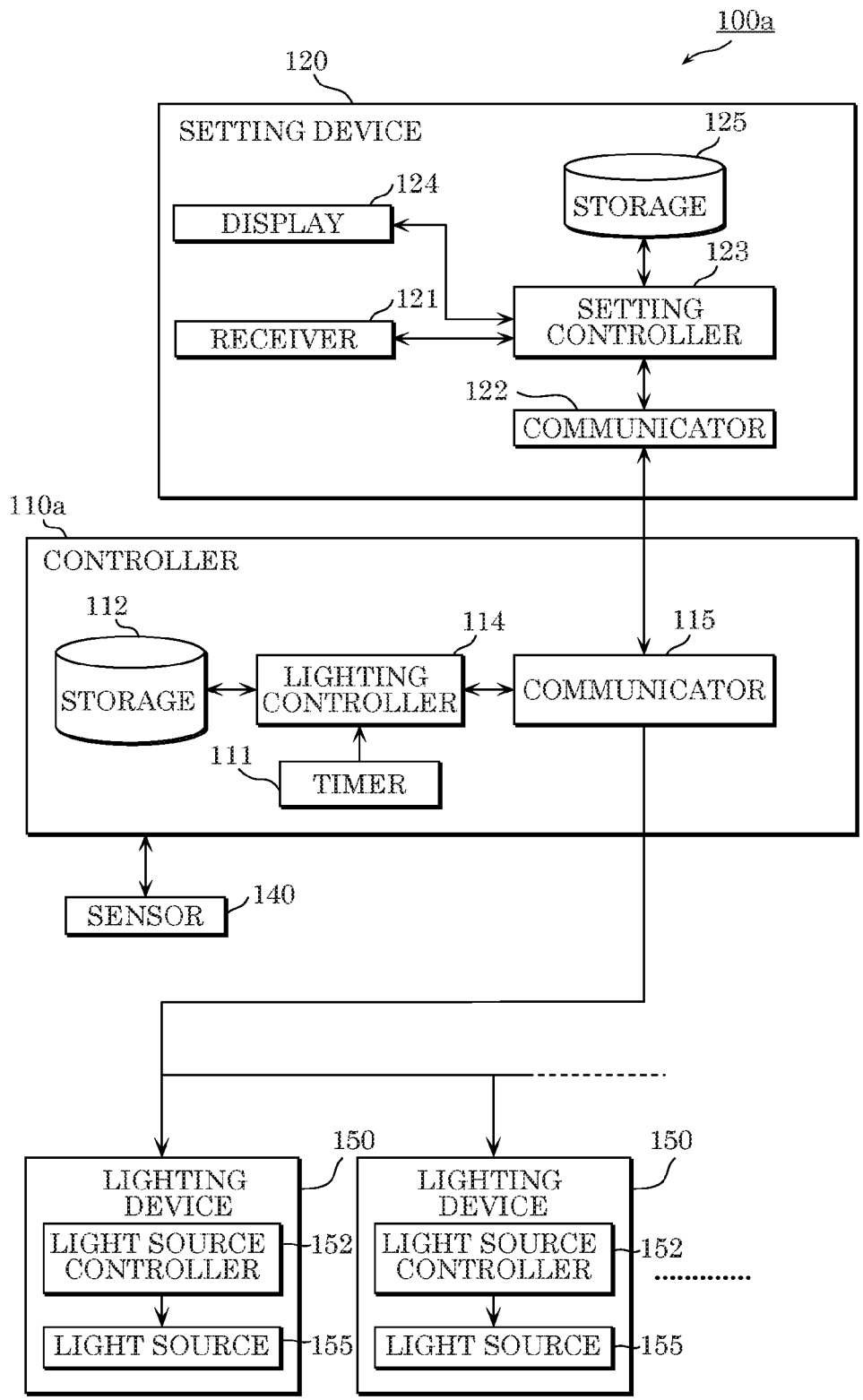
FIG. 6 is a block diagram illustrating a functional configuration of the lighting system according to Embodiment 2.
Figure 7:
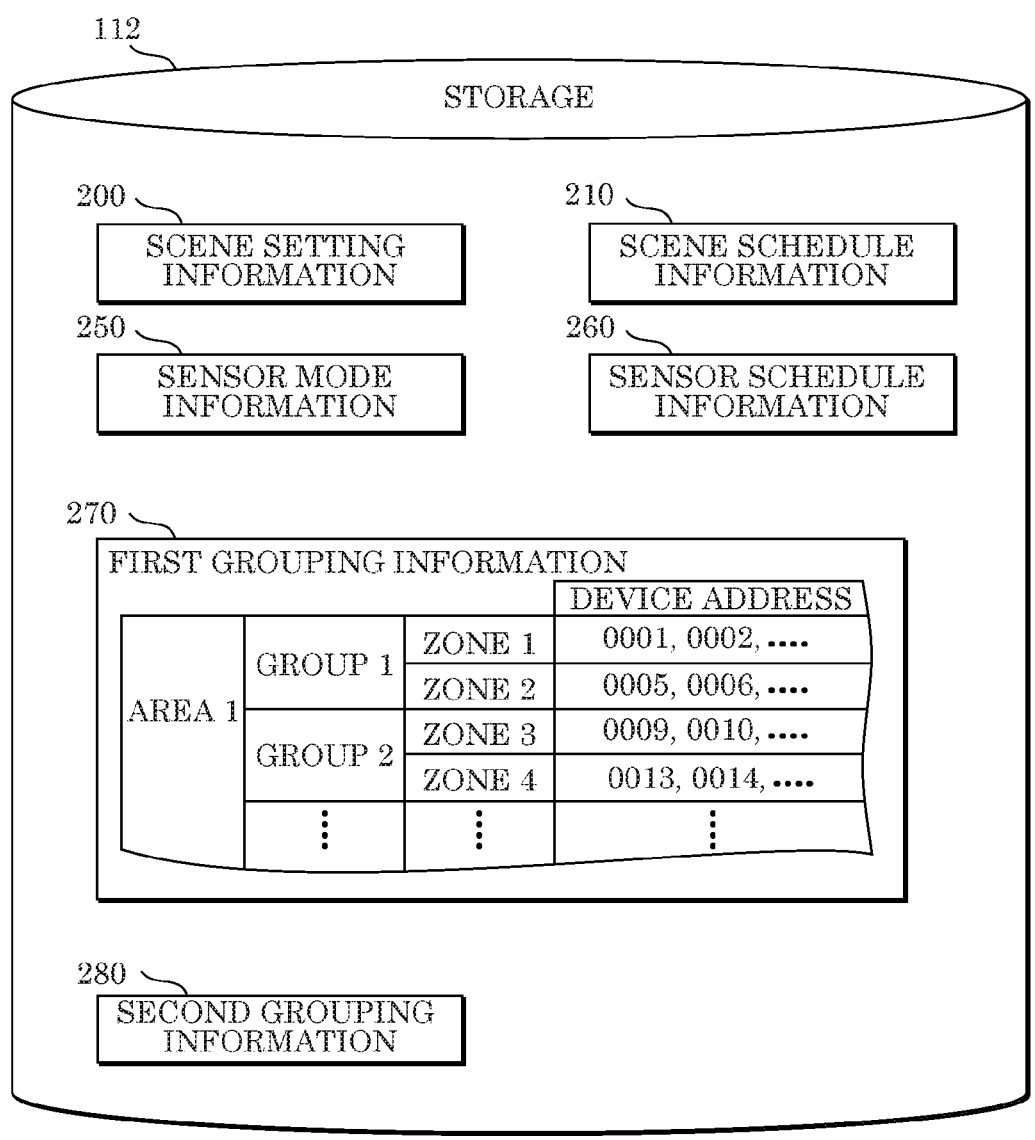
FIG. 7 illustrates an example of a data configuration of first grouping information stored in a storage according to Embodiment 2.

FIG. 6 is a block diagram illustrating a functional configuration of lighting system 100a according to Embodiment 2. FIG. 7 illustrates an example of a data configuration of first grouping information 270 stored in storage 112 according to Embodiment 2.

As illustrated in the drawings, lighting system 100a according to Embodiment 2 includes a plurality of lighting devices 150, controller 110a, and sensor 140. In the present embodiment, lighting system 100a further includes setting device 120.

Although FIG. 5A illustrates lighting system 100a which includes 32 lighting devices 150, lighting system 100a may include two or more lighting devices 150.

32 lighting devices 150 are hierarchically grouped. Note that to "group" means to make one or more groups each including one or more lighting devices 150. Specifically, 32 lighting devices 150 are divided into eight zones (zones 1 to 8) each including four lighting devices 150. In FIG. 5A, the numbers "1" to "8" given to rectangles representing lighting devices 150 indicate zone numbers.

The eight zones are divided into four groups (groups 1 to 4) each including two zones, as illustrated in FIG. 5A. Furthermore, the four groups are divided into two areas (areas 1 and 2) each including two groups, as illustrated in FIG. 5A. Controller 110a stores first grouping information 270 which specifies grouping of lighting devices 150. First grouping information 270 includes device addresses for each zone, as illustrated in FIG. 7, for example. First grouping information 270 includes association among zone, group, and area. Note that "zone," "group," and "area" are examples of device groups.

Controller 110a can control each of lighting devices 150, and can also control lighting devices 150 in units of device groups (zone, group, or area) with reference to first grouping information 270. For example, when lighting controller 114 of controller 110a is to transmit a dimming level to eight lighting devices 150 belonging to group 1, lighting controller 114 reads, from first grouping information 270, eight device addresses of eight lighting devices 150 belonging to zones 1 and 2 associated with group 1. Furthermore, lighting controller 114 transmits an instruction which includes the read eight device addresses and the dimming level to lighting devices 150 via communicator 115.

Each of lighting devices 150 causes light source 155 to provide illumination using the dimming level indicated in the instruction, if the instruction includes the own device address (of lighting device 150). As a result, the dimming levels of eight lighting devices 150 belonging to group 1 are changed to the dimming level transmitted from lighting controller 114. Note that lighting device 150 among lighting devices 150 ignores (or abandons) the instruction if the received instruction does not include the device address of lighting device 150. Each of lighting devices 150 has a device address stored in, for example, a storage device (not illustrated) such as semiconductor memory, and light source controller 152, for example, determines whether to execute or ignore (or abandon) the instruction by determining whether the received instruction includes the device address.

Controller 110a having the above function includes storage 112, lighting controller 114, timer 111, and communicator 115. In the present embodiment, storage 112 is storing scene setting information 200, scene schedule information 210, sensor schedule information 260, first grouping information 270, and second grouping information 280, in addition to sensor mode information 250 described in Embodiment 1. A description of scene setting information 200, scene schedule information 210, sensor schedule information 260, and second grouping information 280 is later given with reference to FIGS. 8, 9, and 12.

Communicator 115 can receive various pieces of information which are transmitted from setting device 120 and are to be included in, for instance, scene setting information 200, by communicating with setting device 120 described below under the control of, for example, lighting controller 114. The various pieces of information received by communicator 115 from setting device 120 are written into storage 112 by lighting controller 114. Furthermore, communicator 115 is used also to transmit an instruction from lighting controller 114 to lighting devices 150. In other words, an instruction from lighting controller 114 to lighting devices 150 is transmitted to lighting devices 150 via communicator 115.

Timer 111 outputs a counter value indicating time. Lighting controller 114 can perform pre-scheduled operation at an appropriate timing, using the counter value output from timer 111.

Setting device 120 is an example of a communication terminal which communicates with controller 110a, and is a tablet terminal according to the present embodiment. Using setting device 120, a user can, for instance, give an instruction to turn on and off lighting devices 150, group lighting devices 150, and schedule, for each group, operation of lighting devices 150 belonging to the group.

Setting device 120 includes receiver 121 which receives, for instance, input of a dimming level and a target value of brightness, and communicator 122 which transmits, to controller 110a, information on, for instance, the dimming level received by receiver 121.

Setting device 120 further includes setting controller 123 which controls operation of setting device 120, display 124 which displays details of setting (such as dimming level) made by controller 110a, and storage 125 which stores the details of the setting.

Note that at least one of various functions of setting device 120 may be achieved by software such as a program executed on a computer which includes, for instance, a CPU, RAM, ROM, a communication interface, and an I/O port, or may be achieved by hardware such as an electronic circuit.

Although the place where controller 110a according to the present embodiment is disposed is not particularly limited, controller 110a is disposed on the ceiling as illustrated in FIG. 5B in the present embodiment. By disposing controller 110a on the ceiling, for example, no matter which position setting device 120 is present, within a region where lighting system 100a is disposed, reliability of communication between setting device 120 and controller 110a is secured.

[Operation of Lighting System]

The following describes an example of operation of lighting system 100a according to the present embodiment with reference to FIGS. 8 to 13.

Figure 8:
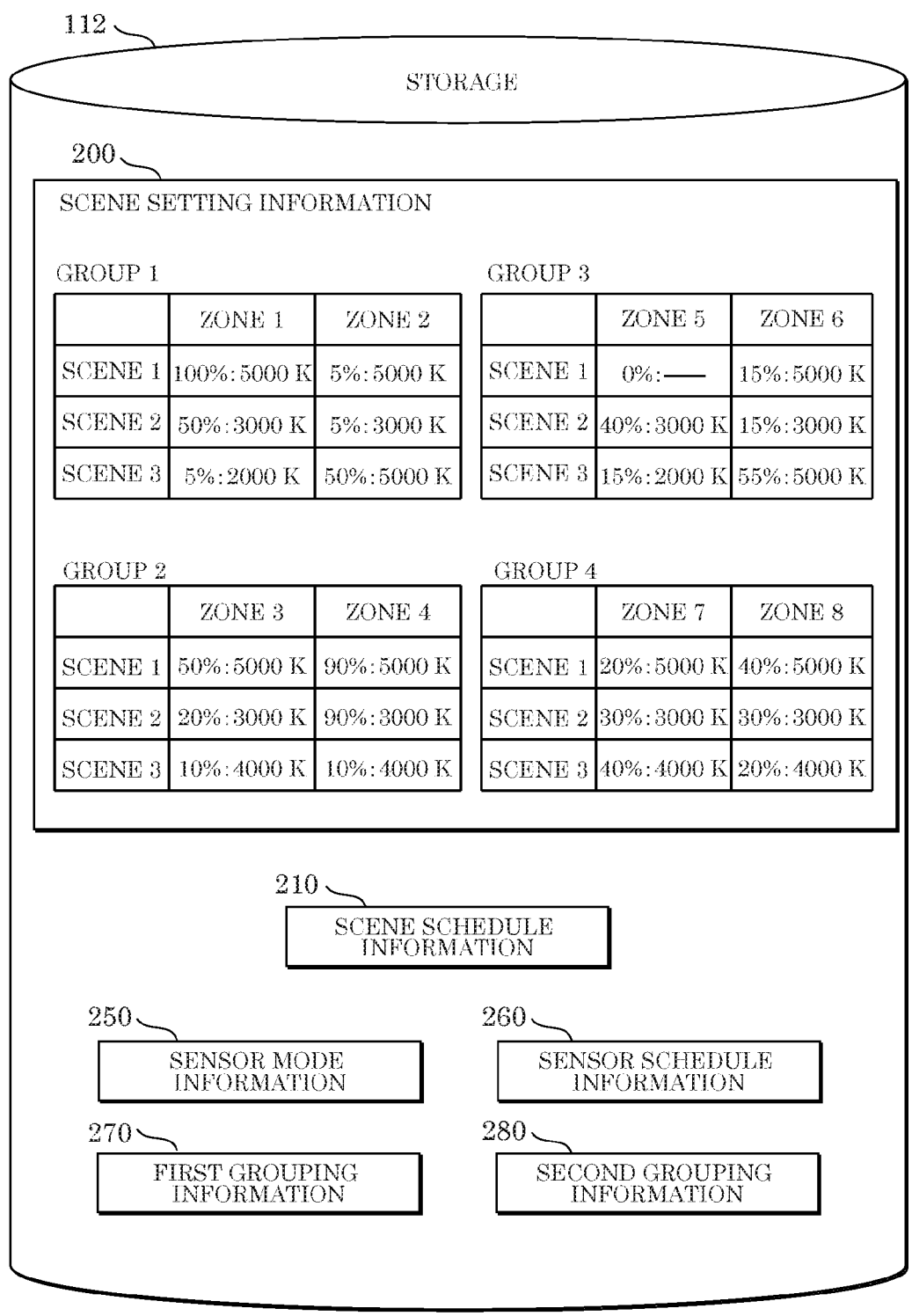
FIG. 8 illustrates an example of a data configuration of scene setting information stored in the storage according to Embodiment 2.
Figure 9:
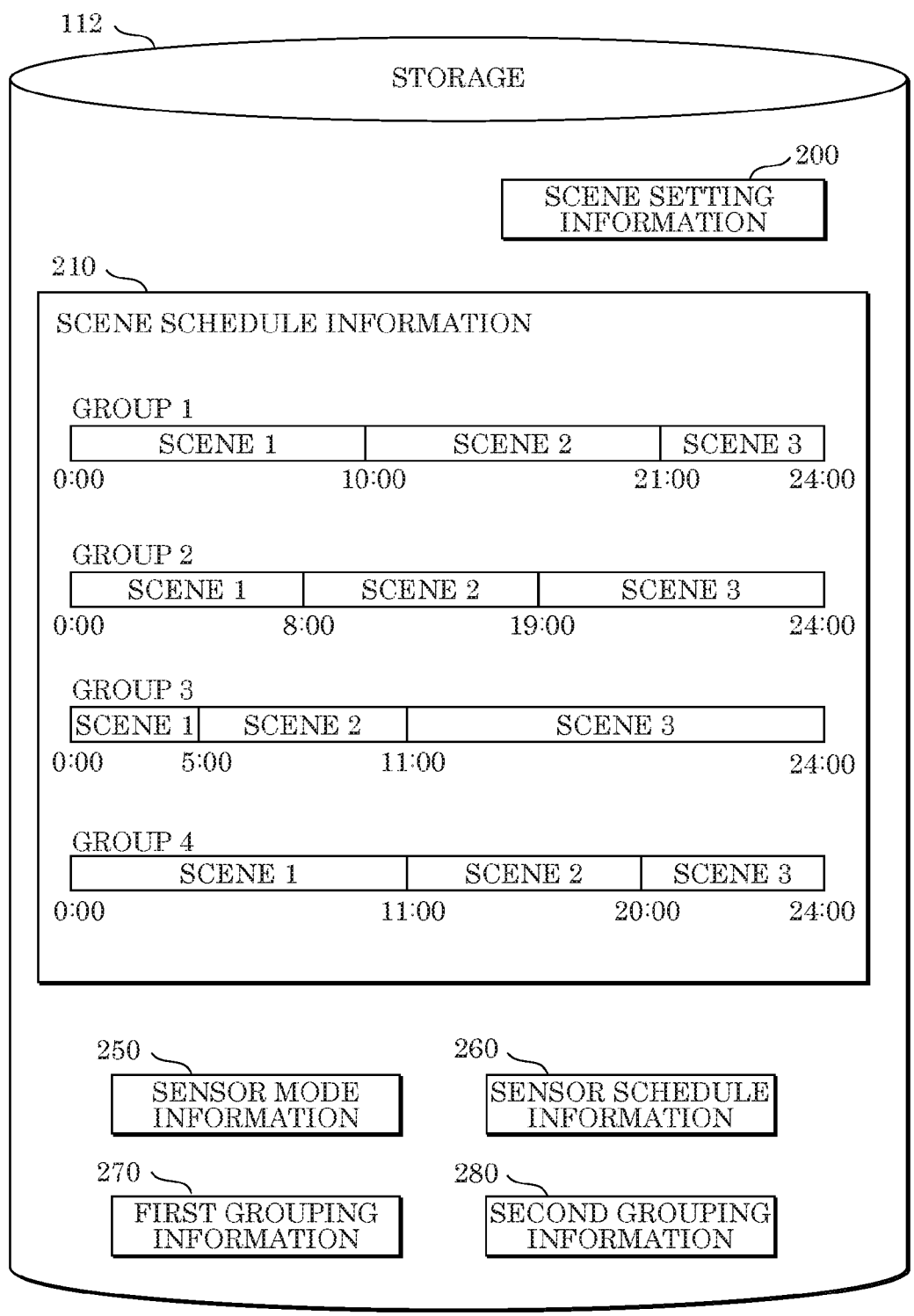
FIG. 9 illustrates an example of a data configuration of scene schedule information stored in the storage according to Embodiment 2.

FIG. 8 illustrates an example of a data configuration of scene setting information 200 stored in storage 112 according to Embodiment 2. FIG. 9 illustrates an example of a data configuration of scene schedule information 210 stored in storage 112 according Embodiment 2. FIG. 10 is a first diagram illustrating states of lighting devices 150 for each group according to Embodiment 2.

Lighting controller 114 of controller 110a according to the present embodiment has a scene mode as one of the operation modes. A scene mode is an operation mode for transmitting, to one or more lighting devices 150, an instruction (scene instruction) to provide illumination at a dimming level for a time period.

Scene setting information 200 and scene schedule information 210 illustrated in FIGS. 8 and 9 are information used for the scene mode.

As illustrated in FIG. 8, scene setting information 200 according to the present embodiment specifies three scenes (scenes 1 to 3) for each group, and a dimming level and a color temperature for each of the scenes and each of the zones.

Scene schedule information 210 is for identifying dimming levels of device groups for each of time periods. Specifically, scene schedule information 210 according to the present embodiment specifies association between a time period and a scene for each group as illustrated in FIG. 9. In the present embodiment, for each group, one of scenes 1 to 3 is associated with each time period from 0:00 to 24:00.

In other words, lighting controller 114 of controller 110a basically operates in the scene mode during all the time periods of a day. Note that a description of the case where the sensor mode interrupts the scene mode is later given with reference to FIGS. 11 to 13.

Lighting controller 114 of controller 110a identifies, from scene schedule information 210, a dimming level of each group for the counter value output from timer 111. Lighting controller 114 further transmits the identified dimming level to one or more lighting devices 150 indicated in scene schedule information 210.

Specifically, if the counter value output from timer 111 indicates, for example, 10:00 (10:00 a.m.), lighting controller 114 determines that scene 1 is to be switched to scene 2 for group 1. Furthermore, lighting controller 114 reads, from scene setting information 200, the dimming levels and the color temperatures of group 1 for scene 2. Specifically, lighting controller 114 reads, from scene setting information 200, "50%" and "3000 K" which are the dimming level and the color temperature of zone 1, and "5%" and "3000 K" which are the dimming level and the color temperature of zone 2.

Lighting controller 114 further identifies, from first grouping information 270 (see FIG. 7), the device addresses of four lighting devices 150 belonging to zone 1 and four lighting devices 150 belonging to zone 2.

Lighting controller 114 transmits, to lighting devices 150 via communicator 115, a scene instruction which includes the device addresses of four lighting devices 150 belonging to zone 1, and "50%" and "3000 K" which are the dimming level and the color temperature of zone 1.

Each of lighting devices 150 causes light source 155 to provide illumination using the dimming level indicated in the scene instruction, and changes the color temperature of light source 155 to the color temperature indicated in the scene instruction, if the scene instruction includes the own address (of lighting device 150). As a result, the dimming levels of four lighting devices 150 belonging to zone 1 is changed to "50%," and the color temperature of four lighting devices 150 is changed to "3000 K."

Similarly, lighting controller 114 transmits a scene instruction which includes the device addresses of four lighting devices 150 belonging to zone 2 and "5%" and "3000 K" which are the dimming level and the color temperature of zone 2 to lighting devices 150 via communicator 115. As a result, the dimming levels of four lighting devices 150 belonging to zone 2 is changed to "5%," and the color temperature of four lighting devices 150 is changed to "3000 K."

Lighting controller 114 of controller 110a performs operation in accordance with scene schedule information 210 as described above, and consequently, lighting devices 150 belonging to the zones of the groups each change the dimming level and the color temperature according to a time period, as illustrated in FIG. 10.

Lighting system 100a according to the present embodiment allows controller 110a which controls lighting devices 150 basically in the scene mode to interruptedly control lighting devices 150 in the sensor mode. Lighting system 100a can also pre-schedule the sensor mode.

Figure 11:
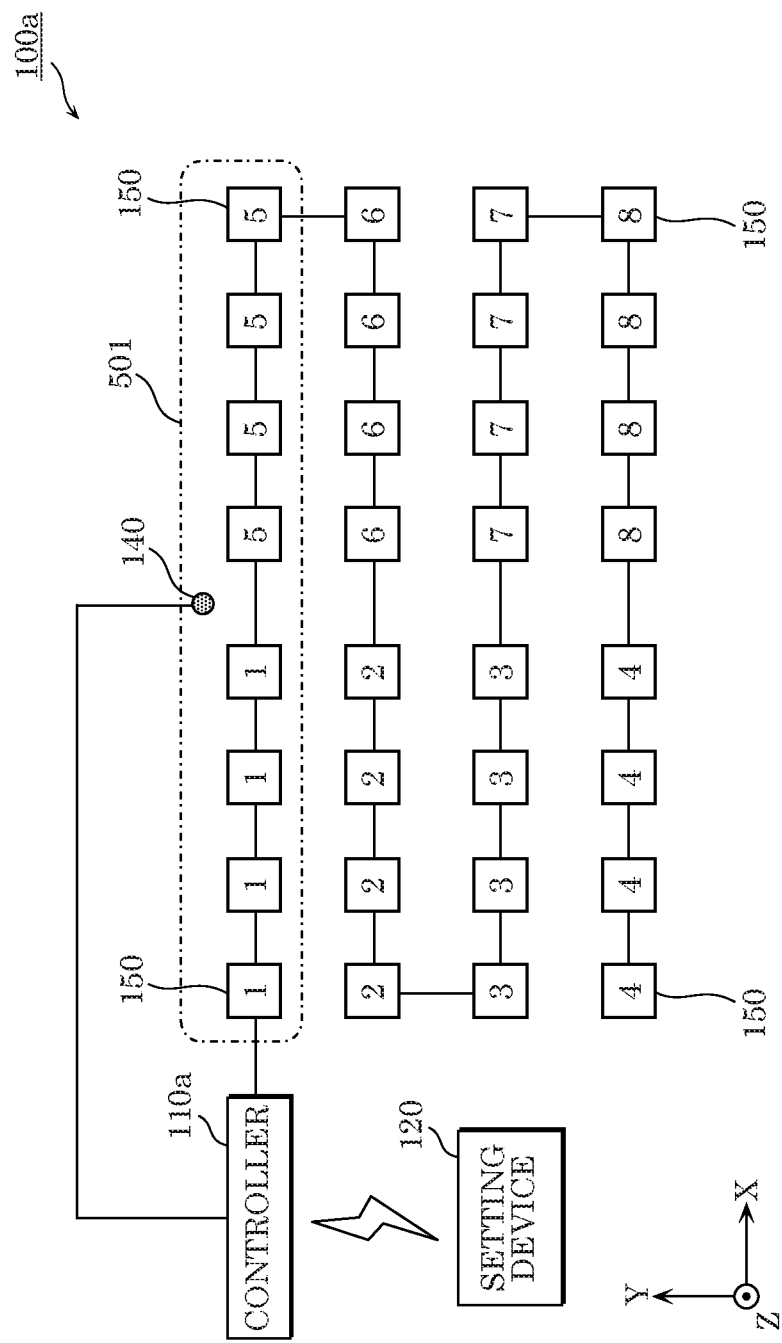
FIG. 11 is a plan view illustrating a detection target region in Embodiment 2.
Figure 12:
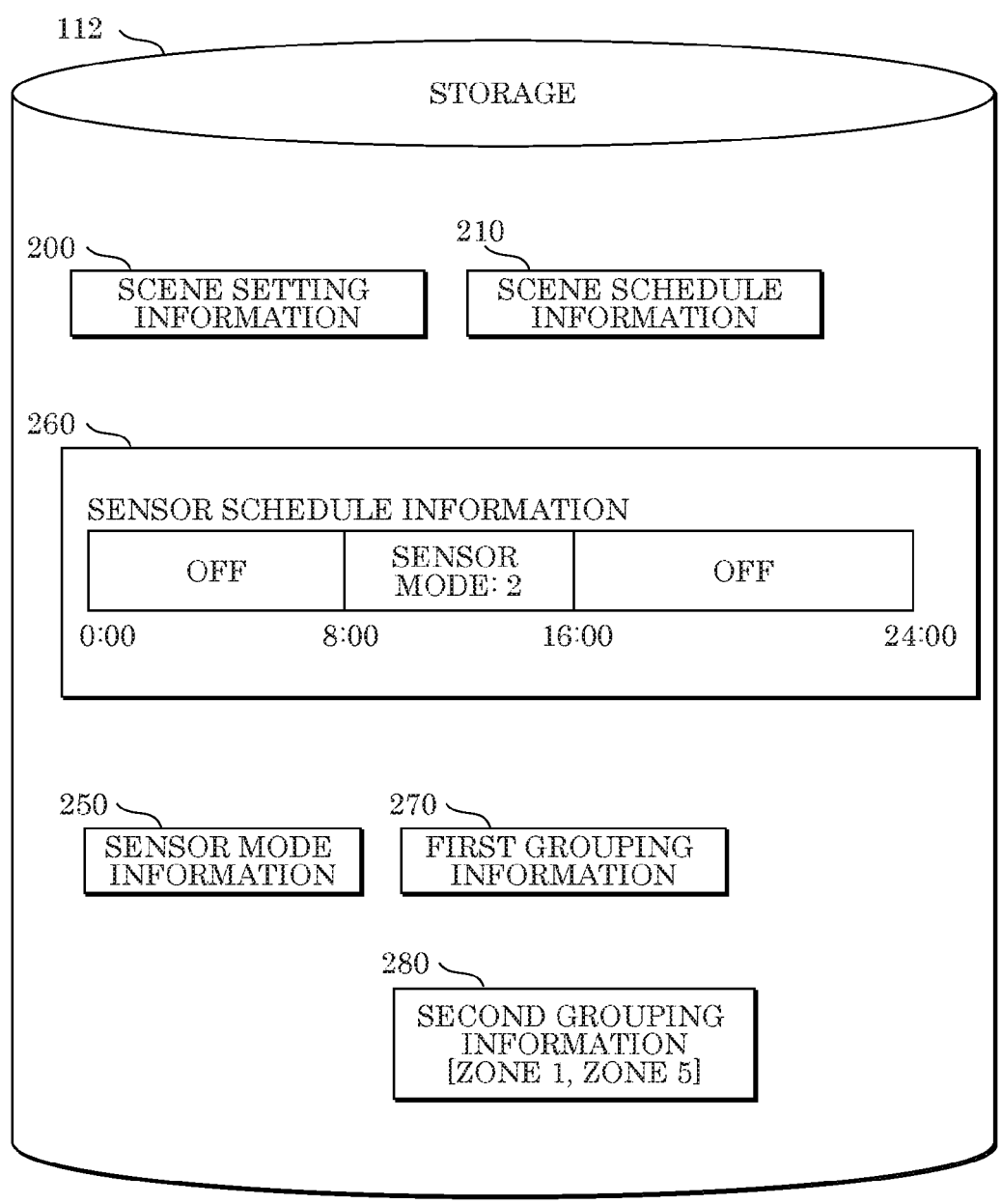
FIG. 12 illustrates examples of data configurations of second grouping information and sensor schedule information stored in the storage according to Embodiment 2.

FIG. 11 is a plan view illustrating detection target region 501 according to Embodiment 2. FIG. 12 illustrates an example of a data configuration of second grouping information 280 and an example of a data configuration of sensor schedule information 260 stored in storage 112 according to Embodiment 2. FIG. 13 is a second diagram illustrating states of lighting devices 150 for each group, according to Embodiment 2.

FIG. 11 illustrates that eight lighting devices 150 belonging to zones 1 and 5 are associated with sensor 140. In other words, lighting system 100a according to the present embodiment groups lighting devices 150 as illustrated in FIG. 5A and furthermore, groups, as illustrated in FIG. 11, lighting devices 150 which have been grouped.

In the present embodiment, sensor 140 detects the brightness of a region (detection target region 501) illuminated by eight lighting devices 150 belonging to zones 1 and 5. According to the result of detection by sensor 140, the dimming of eight lighting devices 150 is controlled.

Specifically, storage 112 of controller 110a stores second grouping information 280 illustrated in FIG. 12. Lighting controller 114 of controller 110a can identify lighting devices 150 the dimming of which is to be controlled according to the result of detection by sensor 140 with reference to second grouping information 280.

Storage 112 is further storing sensor schedule information 260, as illustrated in FIG. 12. Lighting controller 114 can identify a sensor mode to be executed among the sensor modes (sensor modes 1 to 3) and a period during which the sensor mode is to be executed, with reference to sensor schedule information 260.

Sensor schedule information 260 illustrated in FIG. 12 specifies that lighting controller 114 operates in sensor mode 2 from 8:00 to 16:00.

Here, lighting controller 114 operates in accordance with scene schedule information 210 illustrated in FIG. 9. Accordingly, eight lighting devices 150 belonging to zones 1 and 5 provide illumination from 8:00 to 16:00 basically at the dimming level and the color temperature identified from scene schedule information 210.

However, if sensor schedule information 260 illustrated in FIG. 12 is stored in storage 112, lighting controller 114 gives priority to the sensor mode rather than the scene mode, with regard to eight lighting devices 150. In other words, lighting controller 114 controls dimming of eight lighting devices 150 in the sensor mode from 8:00 to 16:00.

As a result, the states of lighting devices 150 transition as illustrated in FIG. 13. Specifically, eight lighting devices 150 belonging to zones 1 and 2 which are controlled in the scene mode are controlled in the sensor mode from 8:00 to 16:00.

Specifically, when the time is 8:00, four lighting devices 150 belonging to zone 1 transition from the scene mode (scene 1) being executed until then to the sensor mode (sensor mode 2). When the time is 8:00, four lighting devices 150 belonging to zone 5 transition from the scene mode (scene 2) being executed until then to the sensor mode (sensor mode 2).

Specifically, in sensor mode 2, as illustrated in FIG. 3, the target value of brightness is "600 lx," the color temperature is "3000 K," and a transition dimming level is "60%."

Under the above condition, lighting controller 114 obtains an instruction to operate in the sensor mode by checking that the counter value output by timer 111 indicates "8:00." In other words, in the present embodiment, lighting controller 114 obtains an instruction to operate in the sensor mode by referring to a counter value and sensor schedule information 260.

Specifically, lighting controller 114 transmits, to four lighting devices 150 belonging to zone 1, a transition instruction to provide illumination at the dimming level "60%," without using the result of detection by sensor 140. In the present embodiment, this transition instruction includes a first fading time (for example, "30 seconds") in addition to the dimming level "60%."

Four lighting devices 150 which have received this transition instruction change the dimming level "100%" set at the time point to "60%," taking 30 seconds.

Similarly, lighting controller 114 performs transition control on four lighting devices 150 belonging to zone 5, once the time is 8:00, which is a trigger. Specifically, lighting controller 114 transmits, to four lighting devices 150, a transition instruction which includes the dimming level "60%" and the first fading time (for example, "30 seconds"). This changes "40%" which is the dimming level of four lighting devices 150 set at the time point to "60%," taking 30 seconds.

Note that lighting controller 114 does not need to change the dimming level of lighting device 150 to a transition dimming level in accordance with one given instruction. For example, if lighting controller 114 is to change the dimming level of lighting device 150 from 100% to 60%, taking 30 seconds, lighting controller 114 may give an instruction multiple times so that the dimming level of lighting device 150 gradually changes from 100% to 60% in units of ten seconds. In other words, a transition instruction to change the dimming level of lighting device 150 to the transition dimming level may be achieved by an instruction given multiple times.

After that, lighting controller 114 controls dimming of eight lighting devices 150 belonging to zones 1 and 5, according to the result of detection by sensor 140. In other words, lighting controller 114 controls eight lighting devices 150 to cause the brightness indicated by the result of detection by sensor 140 to approach the target value "600 lx."

Here, at the time point (8:00) when sensor mode 2 starts which is specified in sensor schedule information 260, the dimming level of four lighting devices 150 belonging to zone 1 is "100%," whereas the dimming level of four lighting devices 150 belonging to zone 5 is "40%." Thus, the two zones have greatly different brightness.

In such a state, assume the case where the dimming control according to the result of detection by sensor 140 immediately starts and furthermore the illuminance detected by sensor 140 at the time point (8:00) is "600 lx." In this case, the detected illuminance matches the target value "600 lx," and thus the dimming levels of lighting devices 150 belonging to zone 1 and lighting devices 150 belonging to zone 5 are not changed. As a result, a state where the two zones have greatly different brightness may be maintained for a long time.

However, in lighting system 100a according to the present embodiment, when transition to the sensor mode is to be made, lighting controller 114 of controller 110a first changes the dimming levels of target lighting devices 150 to a predetermined dimming level (transition dimming level) stored in storage 112. In other words, the dimming levels of lighting devices 150 to be controlled in the sensor mode are all set to the predetermined dimming level. After that, lighting controller 114 controls the dimming of lighting devices 150 according to the result of detection by sensor 140. As a result, the dimming levels of lighting devices 150 which have been set to the predetermined dimming level change substantially in synchronization, and the brightness of a region illuminated by lighting devices 150 reaches the target value.

As described above, the operation mode of lighting controller 114 transitions at 8:00 to the sensor mode, and thereafter if lighting controller 114 has checked that the counter value output by timer 111 indicates "16:00," lighting controller 114 switches the operation mode of zone 1 and zone 5 from the sensor mode to the scene mode.

Specifically, when lighting controller 114 terminates the sensor mode, lighting controller 114 transmits, to a plurality of target lighting devices, a termination instruction which indicates a second fading time (for example, 30 seconds) and a dimming level for the time point (16:00 in the present embodiment) at which the sensor mode terminates, and which is indicated in scene schedule information 210.

Specifically, in the present embodiment, lighting controller 114 transmits to four lighting devices 150 belonging to zone 1, a termination instruction which indicates the dimming level "50%," the color temperature "3000 K," and the second fading time "30 seconds." Each of four lighting devices 150 belonging to zone 1 changes the dimming level to "50%," taking 30 seconds, if lighting device 150 receives the termination instruction. Note that the designated color temperature is "3000 K" in "sensor mode 2" which has been effective until 16:00, and thus the color temperature of four lighting devices 150 is maintained at "3000 K." This returns the control of four lighting devices 150 belonging to zone 1 to the scene mode (scene 2) identified from scene schedule information 210.

Lighting controller 114 transmits, to four lighting devices 150 belonging to zone 5, a termination instruction indicating the dimming level "15%," the color temperature "2000 K," and the second fading time "30 seconds." Four lighting devices 150 belonging to zone 5 each change the dimming level to "15%" and the color temperature to "2000 K," taking 30 seconds. This returns the control of four lighting devices 150 belonging to zone 5 back to the scene mode (scene 3) identified from scene schedule information 210.

[Advantageous Effects and Others]

As described above, lighting system 100a according to the present embodiment has various features as in the following, in addition to the features of lighting system 100a according to the above embodiment.

Specifically, during the transition control when the sensor mode starts, lighting controller 114 transmits, to at least two lighting devices 150, the transition instruction indicating the transition dimming level and a first fading time. Each of light source controllers 152 included in at least two lighting devices 150 changes, taking the first fading time, a dimming level of the light source of each of at least two lighting devices 150 to the transition dimming level, when light source controller 152 receives the transition instruction.

In this manner, lighting controller 114 first performs control (transition control) for making the dimming levels of lighting devices 150 whose dimming is to be controlled according to the result of detection by sensor 140 substantially the same when lighting controller 114 is to transition to the sensor mode, and also designates a period for changing a dimming level (fading time). Accordingly, the dimming levels of lighting devices 150 which transition to the sensor mode are caused to gradually approach the transition dimming level. In other words, the dimming levels are slowly changed when transition to the sensor mode is made, and thus a user will not feel odd due to a rapid change in the dimming level (brightness).

Controller 110a according to the present embodiment includes timer 111 which outputs a counter value indicating time, and storage 112 is storing sensor schedule information 260 indicating a time period during which lighting controller 114 is to operate in the sensor mode. Lighting controller 114 obtains an instruction to operate in the sensor mode by checking that the counter value output by timer 111 falls within the time period.

Specifically, in the present embodiment, a time when controller 110a is to operate in the sensor mode can be preset in controller 110a. Accordingly, for example, transition to the sensor mode can be automatically made every day, during a daytime period when natural light shows a great change. Sensor schedule information 260 can be generated or edited via, for example, a user interface displayed on display 124 of setting device 120, and thus a user can schedule the sensor mode efficiently.

In the present embodiment, controller 110a can switch from one of the scene mode and the sensor mode to the other, and operate in the switched mode. Specifically, the plurality of operation modes in which lighting controller 114 is operable further include a scene mode for transmitting, to each of the at least two lighting devices, a scene instruction to provide illumination at a dimming level for a time period. Storage 112 is further storing scene schedule information 210 for identifying dimming levels of the at least two lighting devices for each of time periods.

When lighting controller 114 is to operate in the scene mode, for each of the at least two lighting devices, lighting controller 114 identifies, from scene schedule information 210, a dimming level of the lighting device for the counter value output by timer 111. Specifically, lighting controller 114 reads, from scene setting information 200, a dimming level for a scene specified in scene schedule information 210. Lighting controller 114 transmits, to the lighting device, the scene instruction which includes the identified dimming level.

When lighting controller 114 obtains an instruction to operate in the sensor mode while operating in the scene mode, lighting controller 114 terminates the scene mode and executes the sensor mode (the transition control and the dimming control).

In this way, in the present embodiment, lighting controller 114 executes the sensor mode to which a priority is given over the scene mode.

Accordingly, for example, as a basic operation mode of controller 110a, the scene mode for switching a scene to another according to a time period can be set, and the sensor mode can be started in only a necessary time period.

When lighting controller 114 is to terminate the sensor mode, lighting controller 114 further transmits, to at least two lighting devices 150, a termination instruction indicating a second fading time and a dimming level for a time point at which the sensor mode is terminated, the dimming level being identified from scene schedule information 210. Each of light source controllers 152 included in at least two lighting devices 150 changes, taking the second fading time, a current dimming level used to cause light source 155 to provide illumination to the dimming level indicated by the termination instruction, when light source controller 152 receives the termination instruction.

As described above, when the sensor mode terminates and the mode is back to the scene mode, the dimming levels of lighting devices 150 controlled in the sensor mode are caused to gradually approach the dimming levels for the time point which are specified in scene schedule information 210. In other words, a dimming level is slowly changed when the sensor mode transitions to the scene mode, and thus a user will not feel odd due to a rapid change in the dimming level (brightness).

In the present embodiment, storage 112 is storing first grouping information 270 and second grouping information 280. First grouping information 270 indicates addresses (device addresses) of plurality of lighting devices 150, the addresses each being associated with one of a plurality of device groups ("zone", "group", or "area" in the present embodiment). Second grouping information 280 indicates addresses of at least two lighting devices, dimming of which is to be controlled according to the result of detection by sensor 240. Scene schedule information 210 is for identifying dimming levels of the plurality of device groups for each of the time periods, When lighting controller 114 is to operate in the scene mode, lighting controller 114 identifies, from first grouping information 270, one or more addresses of one or more lighting devices belonging to a device group among the plurality of device groups, and transmits, to the plurality of lighting devices, the scene instruction which includes the identified one or more addresses and a dimming level for the counter value and the device group. When lighting controller 114 obtains an instruction to operate in the sensor mode, lighting controller 114 transmits, to the plurality of lighting devices 150, the transition instruction which includes the addresses of at least two lighting devices 150 indicated in second grouping information 280.

For each of the plurality of lighting devices 150, when light source controller 152 included in lighting device 150 receives the scene instruction and the scene instruction includes the address of the lighting device (lighting device 150), light source controller 152 causes the light source to provide illumination at the dimming level indicated in the scene instruction. When light source controller 152 included in lighting device 150 receives the transition instruction and the transition instruction includes the address of lighting device 150, light source controller 152 causes light source 155 to provide illumination at the dimming level indicated in the transition instruction.

As described above, in the present embodiment, operation in the scene mode for automatically switching between the dimming levels according to a time period is possible for each of device groups (zones, groups, or areas) obtained by grouping lighting devices 150. Furthermore, lighting devices 150 whose dimming is to be controlled according to the result of detection by sensor 140 can be designated independently of the grouping. Specifically, when one lighting device 150 (referred to as "lighting device A") is focused on, for example, if a group to which lighting device A belongs is to be controlled in the scene mode, it is possible to change only lighting device A to be subjected to the control in the sensor mode. Accordingly, operation modes of lighting devices 150 can be assigned flexibly.

Lighting system 100a according to the present embodiment includes setting device 120 which is a communication terminal. Setting device 120 includes a receiver which receives input of, for example, a variable used for setting the sensor mode (such as the transition dimming level and the target value of brightness), and a communicator which transmits the variable received by the receiver to controller 110a.

Setting device 120 can exchange information with controller 110a by, for example, short range wireless communication such as Bluetooth (registered trademark) or network communication such as wireless local area network (LAN). Accordingly, the user can make setting of the sensor mode, the scene mode, and others, with setting device 120 that the user carries.

If a general-purpose communication terminal such as a tablet terminal is used as setting device 120, the types of information which can be set in controller 110a via setting device 120 can be added or changed by updating a program executed by the communication terminal. This allows setting device 120 to readily handle a change in the number of, the types of, or the technical specifications of lighting devices 150 included in lighting system 100a, for example.

Note that examples of a communication terminal used as setting device 120 include, for instance, a smartphone, a notebook personal computer (PC), and a dedicated remote control, in addition to a tablet terminal.

OTHER EMBODIMENTS

The above has described the lighting device according to the present disclosure based on Embodiments 1 and 2 above, yet the present disclosure is not limited to Embodiments 1 and 2 above.

For example, the content of various pieces of information stored in storage 112 and illustrated in FIGS. 3, 7 to 9, and 12 is an example, and thus the present disclosure is not limited to the numerical values, the item names, and others shown in the drawings. For example, sensor schedule information 260 may include a variable included in sensor mode information 250 (target value, color temperature, and transition dimming level). In this case, lighting controller 114 can obtain a period during which lighting controller 114 is to operate in the sensor mode and various variables used for the sensor mode, with reference to sensor schedule information 260 only.

Controllers 110 and 110a do not need to have a function (color adjustment function) of controlling the color temperatures of lighting devices 150. In other words, storage 112 does not need to store the color temperatures used for the sensor mode and the scene mode.

Furthermore, the result of detection by sensor 140 does not need to be information indicating the magnitude relation between the detected illuminance and the target value. For example, lighting controller 114 may obtain information which indicates a detected illuminance as a result of detection by sensor 140. Lighting controller 114 may compare the obtained detected illuminance and the target value, and control dimming of lighting devices 150 in accordance with the result of the comparison.

In Embodiment 2, transition from the scene mode to the sensor mode may be automatically made in accordance with sensor schedule information 260, yet transition from the scene mode to the sensor mode may be made in accordance with, for example, a user instruction which is a trigger. For example, a user may give an instruction to controller 110a by operating setting device 120 or controller 110a, to control, in the sensor mode, at least two lighting devices 150 being controlled in the scene mode. At this time, at least two lighting devices 150 controlled in the sensor mode may be identified from second grouping information 280, or may be designated by the user.

Light source 155 included in lighting device 150 may not be achieved by one or more LEDs. For example, one or more fluorescence tubes may be used as light source 155. A semiconductor light emitting element such as a semiconductor laser or a light emitting element such as an organic or inorganic electroluminescent (EL) element may be used as light source 155.

The present disclosure may be achieved as a program which causes a computer to execute distinctive processing performed by controller 110 or 110a. Such a program can be distributed via a recording media such as CD-ROM and a transmission medium such as the Internet.

The scope of the present disclosure may also include embodiments as a result of adding various modifications to the embodiments that may be conceived by those skilled in the art, and embodiments obtained by combining elements in the embodiments in any manner as long as the combination does not depart from the spirit of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A lighting system comprising:
a plurality of lighting devices;
a controller which controls each of the plurality of lighting devices; and
a sensor which detects brightness of a region illuminated by at least two lighting devices among the plurality of lighting devices, wherein:
each of the plurality of lighting devices includes:
a light source; and
a light source controller which controls the light source in accordance with an instruction transmitted from the controller,
the controller includes:
a storage storing a predetermined dimming level and a target value of the brightness of the region; and
a lighting controller operable in a plurality of operation modes,
the plurality of operation modes include a sensor mode for controlling the at least two lighting devices to cause the brightness of the region to approach the target value, and
when the lighting controller obtains an instruction to operate in the sensor mode, the lighting controller performs (a) transition control for controlling the at least two lighting devices, by transmitting a transition instruction, to cause the at least two lighting devices to provide illumination at the predetermined dimming level, without using a result of detection by the sensor, and (b) dimming control for controlling the at least two lighting devices to cause the brightness indicated by the result of detection by the sensor to approach the target value, after transmitting the transition instruction.

2. The lighting system according to claim 1, wherein:
during the transition control, the lighting controller transmits, to the at least two lighting devices, the transition instruction indicating the predetermined dimming level and a first fading time, and
each of the light source controllers included in the at least two lighting devices changes, taking the first fading time, a dimming level of the light source of each of the at least two lighting devices to the predetermined dimming level, when the light source controller receives the transition instruction.

3. The lighting system according to claim 1, wherein:
the controller further includes a timer which outputs a counter value indicating time,
the storage is further storing sensor schedule information indicating a time period during which the lighting controller is to operate in the sensor mode, and
the lighting controller obtains an instruction to operate in the sensor mode by checking that the counter value output by the timer falls within the time period.

4. The lighting system according to claim 3, wherein
the plurality of operation modes further include a scene mode for transmitting, to each of the at least two lighting devices, a scene instruction to provide illumination at a dimming level for a time period,
the storage is further storing scene schedule information for identifying dimming levels of the at least two lighting devices for each of time periods,
when the lighting controller is to operate in the scene mode, for each of the at least two lighting devices, the lighting controller identifies, from the scene schedule information, a dimming level of the lighting device for the counter value, and transmits, to the lighting device, the scene instruction which includes the identified dimming level, and
when the lighting controller obtains an instruction to operate in the sensor mode while operating in the scene mode, the lighting controller terminates the scene mode and performs the transition control and the dimming control.

5. The lighting system according to claim 4, wherein when the lighting controller is to terminate the sensor mode, the lighting controller further transmits, to the at least two lighting devices, a termination instruction indicating a second fading time and a dimming level for a time point at which the sensor mode is terminated, the dimming level being identified from the scene schedule information, and each of the light source controllers included in the at least two lighting devices changes, taking the second fading time, a current dimming level used to cause the light source to provide illumination to the dimming level indicated by the termination instruction, when the light source controller receives the termination instruction.

6. The lighting system according to claim 4, wherein:
the storage is further storing:
   first grouping information indicating addresses of the plurality of lighting devices, the addresses each being associated with one of a plurality of device groups; and
   second grouping information indicating addresses of the at least two lighting devices,
the scene schedule information is for identifying dimming levels of the plurality of device groups for each of the time periods,
when the lighting controller is to operate in the scene mode, the lighting controller identifies, from the first grouping information, one or more addresses of one or more lighting devices belonging to a device group among the plurality of device groups, and transmits, to the plurality of lighting devices, the scene instruction which includes the identified one or more addresses and a dimming level for the counter value and the device group,
when the lighting controller obtains an instruction to operate in the sensor mode, the lighting controller transmits, to the plurality of lighting devices, the transition instruction which includes the addresses of the at least two lighting devices indicated in the second grouping information, and
for each of the plurality of lighting devices, when the light source controller included in the lighting device receives the scene instruction and the scene instruction includes the address of the lighting device, the light source controller causes the light source to provide illumination at the dimming level indicated in the scene instruction, and when the light source controller included in the lighting device receives the transition instruction and the transition instruction includes the address of the lighting device, the light source controller causes the light source to provide illumination at the dimming level indicated in the transition instruction.

7. A lighting system comprising:
a plurality of lighting devices;
a controller which controls each of the plurality of lighting devices;
a sensor which detects brightness of a region illuminated by at least two lighting devices among the plurality of lighting devices; and
a communication terminal which communicates with the controller, wherein:
the plurality of lighting devices each include:
   a light source; and
   a light source controller which controls the light source in accordance with an instruction transmitted from the controller,
the communication terminal includes:
   a receiver which receives input of a predetermined dimming level and a target value of the brightness of the region; and
   a communicator which transmits, to the controller, the predetermined dimming level and the target value received by the receiver,
the controller includes:
   a storage storing the predetermined dimming level and the target value transmitted by the communication terminal; and
   a lighting controller operable in a plurality of operation modes, the plurality of operation modes include a sensor mode for controlling the at least two lighting devices to cause the brightness of the region to approach the target value, and
when the lighting controller obtains an instruction to operate in the sensor mode, the lighting controller performs (a) transition control for controlling the at least two lighting devices, by transmitting a transition instruction, to cause the at least two lighting devices to provide illumination at the predetermined dimming level, without using a result of detection by the sensor, and (b) dimming control for controlling the at least two lighting devices to cause the brightness indicated by the result of detection by the sensor to approach the target value, after transmitting the transition instruction.

8. A controller which controls each of a plurality of lighting devices, the controller comprising:
a storage storing a predetermined dimming level and a target value of brightness of a region illuminated by at least two lighting devices among the plurality of lighting devices; and
a lighting controller operable in a plurality of operation modes including a sensor mode for controlling the at least two lighting devices to cause the brightness of the region to approach the target value, wherein:
when the lighting controller obtains an instruction to operate in the sensor mode, the lighting controller performs (a) transition control for transmitting, to the at least two lighting devices, a transition instruction to provide illumination at the predetermined dimming level, without using a result of detection by the sensor which detects the brightness of the region, and (b) dimming control for transmitting, to the at least two lighting devices, a dimming control instruction to cause the brightness indicated by the result of detection by the sensor to approach the target value, after transmitting the transition instruction.

9. A lighting system comprising:
a plurality of lighting devices;
a controller which controls each of the plurality of lighting devices; and
a sensor which detects brightness of a region illuminated by at least two lighting devices among the plurality of lighting devices, wherein:
each of the plurality of lighting devices includes:
   a light source; and
   a light source controller which controls the light source in accordance with an instruction transmitted from the controller,
the controller includes:
   a storage storing a transition dimming level and a target value of the brightness of the region; and a lighting controller operable to control the lighting devices in a plurality of operation modes, the plurality of operation modes include a forced control mode and a sensor control mode, in the sensor control mode, the lighting controller controls the at least two lighting devices to cause the brightness of the region to approach the target value by using a result of detection by the sensor, in the forced control mode, the lighting controller controls the at least two lighting devices to cause the lighting devices to operate at the predetermined dimming level, without using the result of detection by the sensor, and when the lighting controller obtains an instruction to equalize the at least two lighting devices, the lighting controller controls the at least two lighting devices in the forced control mode, and thereafter transitions to the sensor control mode.

* * * * *